(12) United States Patent
Hasson

(10) Patent No.: US 6,967,977 B2
(45) Date of Patent: Nov. 22, 2005

(54) OPTICAL PULSE TRAIN GENERATOR

(75) Inventor: Victor H. Hasson, Winchester, MA (US)

(73) Assignee: Textron Systems Corporation, Wilmington, MA (US)

( * ) Notice: Subject to any disclaimer, the term of this patent is extended or adjusted under 35 U.S.C. 154(b) by 377 days.

(21) Appl. No.: 10/194,873

(22) Filed: Jul. 12, 2002

(65) Prior Publication Data

US 2003/0012236 A1    Jan. 16, 2003

Related U.S. Application Data

(60) Provisional application No. 60/304,996, filed on Jul. 12, 2001.

(51) Int. Cl.[7] .............................. H01S 3/13; H01S 3/08; H01S 3/00
(52) U.S. Cl. .................... 372/30; 372/32; 372/107; 372/700
(58) Field of Search .............................. 372/30, 28, 32, 372/101, 107, 700; 359/331

(56) References Cited

U.S. PATENT DOCUMENTS

| 5,339,186 | A |   | 8/1994  | Weverka |
|---|---|---|---|---|
| 5,448,417 | A | * | 9/1995  | Adams ........................ 359/856 |
| 5,960,016 | A |   | 9/1999  | Perry et al. |
| 5,978,125 | A |   | 11/1999 | Yao |
| 6,075,640 | A | * | 6/2000  | Nelson ........................ 359/239 |
| 6,215,941 | B1 |  | 4/2001  | Nagai et al. |
| 6,256,328 | B1 |  | 7/2001  | Delfyett et al. |
| 2001/0046250 | A1 | | 11/2001 | Arbel et al. |
| 2002/0034199 | A1 | | 3/2002 | Galvanauskas et al. |

FOREIGN PATENT DOCUMENTS

WO    WO 0085/04064    9/1985

OTHER PUBLICATIONS

Ka-Suen Lee, Terabit-per-second time division multiplexer, 1999,IEEE,210-211.*

Yelin, D.; et al., "Adaptive femtosecond pulse compression," optics Letters, Dec. 1, 1997, pp. 1793-1795, vol. 22, No. 23.

Jacobsen, R.H.; "Optoelectronic Terahertz Switching", pp. 290-291, (visited Jul. 9, 2002) <http://www.au.dk/uk/aj1997/aj97s290.pdf>.

Tang, J.M.; et al., "Terahertz Optical Asymmetric Demultipexer Based on Semiconductor Optical Amplifiers with Robust Trhansparency", (visited Jul. 9, 2002) <frhewww.physik.uni-freiburg.de/~puhd/homepage/itw2000/program.html>.

(Continued)

Primary Examiner—Minsun Oh Harvey
Assistant Examiner—Armando Rodriguez
(74) Attorney, Agent, or Firm—Lesley A. Hamlin; Gregory M. McCloskey

(57) ABSTRACT

A laser source provides a pulse that is subdivided and replicated into subpulses by a delay structure having a plurality of steps. Each of the subpulses is delayed by one of the plurality of steps and the amount that each subpulse is delayed is different than the others with respect to the pulse. The amount of each delay, and the consequent time delay produced, is greater than the duration of the pulse, which minimizes overlap between adjacent subpulses. The pulse may be transmitted through the delay structure or it may be reflected from the delay structure. Repetition rates of up to hundreds of THz or greater are achieved, and the system and method may be used in Time Division Multiplexing Systems. Information may be transmitted and carried by the subpulses by appropriate modulation techniques.

31 Claims, 4 Drawing Sheets

OTHER PUBLICATIONS

"The Diversification of Ultrafast Lasers: The "one box" concept takes hold," NASA, Photonics Tech Briefs, Oct. 2001 <http://www.nasatech.com>.

Ironside, C.N.; "Investigation of monolithically modelocked semiconductor lasers," (visited May 7, 2002) <http://userweb.elec.gla.ac.uk/i/ironside/CNIStudents.html>.

"Integrated Sunlight Spectrometer", National Solar Observatory (visited Apr. 23, 2002) <http://www.nso.noao.edu/solis/ISSOverview.thml>.

Krainer, L.; et al., "29 GHz modelocked miniature Nd:YVO laser," Electronics Letters, Jul. 8, 1999, vol. 35, No. 14.

Bloom, D.M., "The Grating Light Valve: revolutionizing display technology", Silicon Light Machines (visited Apr. 23, 2002) <http://www.siliconlight.com/htmlpgs/glvtechframes/glvmainbody.html>.

Planken, P.C.M.; "Generation and application of THz radiation ", (visited May 6, 2002) <http://www.hfwork3.tn.tudelft.n1/group/thzgen.thml>.

Jackel, H.; "High Speed Photonics/Optoelectronics: Ultrashort Light Pulses from Laser Diodes for Terabit/s-Lightwave Communication," (visited May 7, 2002) <http://www.ee.ethz.ch/research/electronics/opto.en.html>.

Ironside, C.N.; et al., "NATO New Directions in TeraHertz Technology, Jul. 1996: Multi-gigahertz optoelectronic devices Part 2: Monolithic, harmonic modelocking of semiconductor lasers," (visited May 7, 2002) <http://userweb.elec.gla.ac.uk/i/ironside/NATO2.html>.

Lee, et al., "Terabit-per-second Time Division Multiplexer," 0-7803-5634-9, IEEE, p. 210-211, (1999).

James M. Florence, "Monolithic Optical Time Shift Network for Phased Arrays," 90CH2776-3/0000-0782, IEEE, p. 782-785, (1990).

International Search Report in related International PCT application serial No. US02/22262—Mailed on Sep. 3, 2003.

Saito, T.; et al., "16-ch Arrayed Waveguide Grating Module with 100-GHz Spacing," 2000, pp. 47-52. Furukawa Review, No. 19.

Leaird, D.E.; et al., "500 GHz Repetition Rate WDM Pulse Train Generation Via Direct Space-to-Time Pulse Shaping—Bulk & Integrated Optics Implementations," (visited Jul. 9, 2002) <http://www.ieee.org/organizations/pubs/newsletters/leos/dec00/500.html>.

Corrigan, R.; et al., "Silicon Light Machines Grating Light Valve Technology Brief: Breakthrough MEMS Component Technology for Optical Networks," Silicon Light Machines, pp. 1-8, Jun. 2001 ver. C, <http://www.siliconlight.com/htmlpgs/glvtechframes/glvmainbody.html.>.

Hui, R.; et al., "Generation of Ultrahigh-Speed Tunable-Rate Optical Pulses Using Strongly Gain-Coupled Dual-Wavelength DFB Laser Diodes," IEEE Photonics Technology Letters, May 1999, pp. 518-520, vol. 11, No. 5.

Schewe, P.; et al., "Attosecond Physics Has Arrived," Physics New Update, (last updated Nov. 29, 2001) <http://www.aip.org/enews/physnews/2001/split/567-1.html>.

"GLV Technology," Silicon Light Machines, (visited Apr. 23, 2002) <http://www.siliconlight.com/htmlpgs/glvtechframes/glvmainbody.html>.

Thermo Richardson Grating Laboratory, "Technical Note 2: Pulse Compression and Stretching with Diffraction Gratings," (visited May 6, 2002) <http://www.gratinglab.com/library/techNotes/techNote2.asp>.

Kim, A.V.; et al., "From femtosecond to attosecond pulses," Jan. 1999, Conferences and Symposia, Physics-Uspekhi42 (1), pp. 54-61.

"Lucent X-4050M1 Arrayed Waveguide Grating Structural Analysis," (visited May 7, 2002) <http://www.chipworks.com/reports/flyers/Lucent X4050M1.html>.

Amm, David, T.; Corrigan, Robert W., "Optical Performance of the Grating Light Valve Technology," Silicon Light Machines (visited Apr. 23, 2002) <http://www.siliconlight.com/htmlpgs/glvtechframes/glvmainbody.html.>.

Arahira, S.; et al., "Mode-Locking at Very High Repetition Rates More than Terahertz in Passively Mode-Locked Distributed-Bragg-Reflector Laser Diodes," IEEE Journal of Quantum Electronics, Jul. 1996, pp. 1211-1224, vol. 32, No. 7.

* cited by examiner

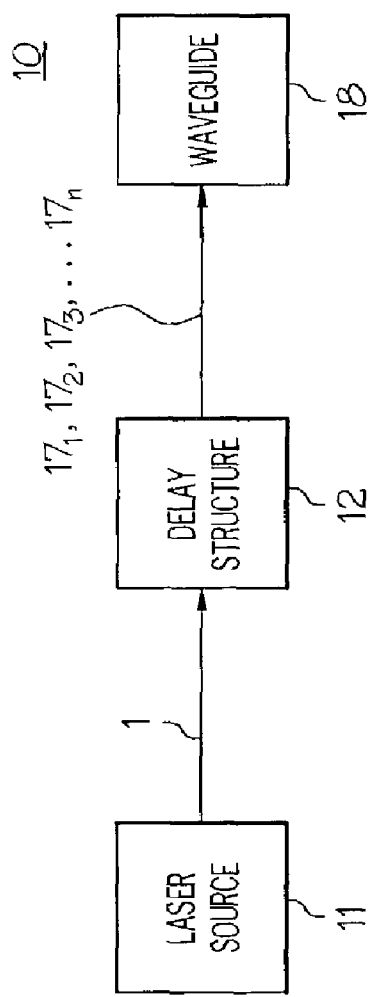
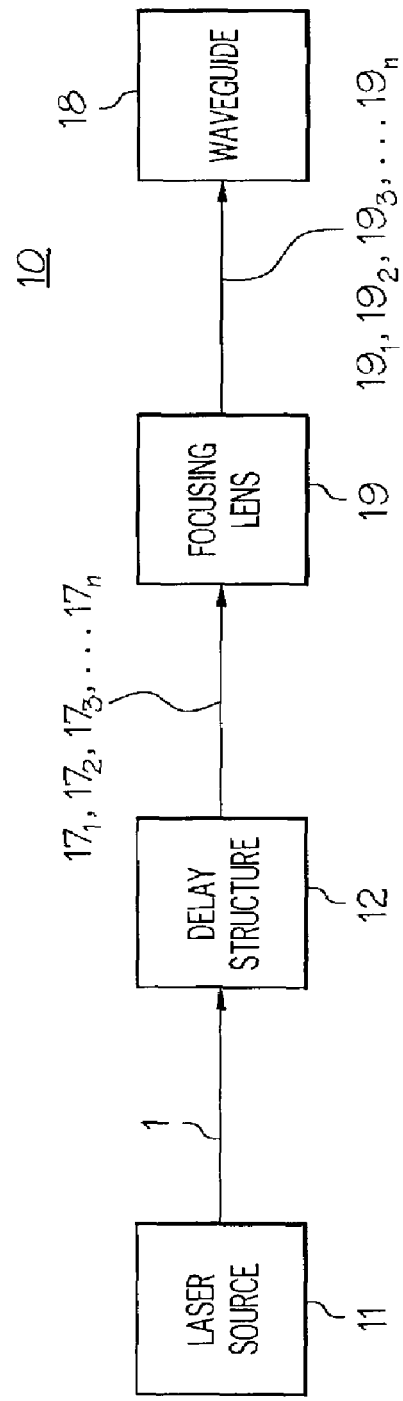

US 6,967,977 B2

OPTICAL PULSE TRAIN GENERATOR

Priority is claimed for this application under 35 U.S.C. § 119 to U.S. provisional Patent Application Ser. No. 60/304,996, filed Jul. 12, 2001, the contents of which are incorporated herein by reference.

BACKGROUND OF THE INVENTION

With the growing demand for communications systems capable of transmitting increasing amounts of information, optical communication systems have gained in prominence, and have become a standard for telecommunications. Such systems have typically utilized wavelength division multiplexing ("WDM") or time division multiplexing ("TDM") techniques.

Communications systems that use TDM techniques utilize the allocation of successive time segments of a stream of continuous data transmitted by the systems for separate carrier signals. In such TDM communications systems, the separate carrier signals are sampled at predetermined intervals and for a predetermined duration. The samples of the separate carrier signals are then combined or "multiplexed" and transmitted in succession over a transmission link of the TDM system, which is typically an optical fiber. After transmission through the TDM system, the samples corresponding to the individual carrier signals are separated or "demultiplexed" and then the carrier signals are recovered. Communications systems that use WDM techniques differ from TDM systems in that they utilize the simultaneous transmission of carrier signals of different discrete frequencies.

To illustrate, for a TDM system transmitting four carrier signals, a time slot having a set duration would be determined for the system, typically by taking into consideration various equipment-related parameters of the system. Samples would be taken of each of the four carrier signals, with each sample having a duration that is equal to or less than the predetermined time slot duration. These samples would then be combined and transmitted sequentially over a fiber optic transmission line, with every fourth time slot of the predetermined duration being allotted to a sample of one of the four separate carrier signals.

With the growing applicability of optical communications systems, particularly TDM systems, there has been a concurrent increase in demand for optical pulse generators capable of increasingly rapid repetition rates. Presently optical pulse generators with repetition rates in the GigaHertz (GHz) range are known. Optical pulse generators with repetition rates of a few TeraHertz (THz) are also known.

While some optical pulse generators have been realized in the prior art, none are known to have been capable of producing optical pulses with repetition rates of hundreds of THz. For example, an Ultrashort-Pulse Source with Controllable Multiple-Wavelength Output is described in U.S. Patent Application Publication No. US2002/0034199A1. This disclosure is concerned with the wavelength conversion of pulses from an ultrashort-pulse laser producing pulses in the femtosecond (fs) to picosecond (ps) regime. The pulses produced by the ultrashort-pulse laser are then converted to one or more different wavelengths by means of optical parametric generation in integrated waveguides. These converted pulses are not more rapid or frequent than the pulses produced by the ultrashort-pulse laser, and consequently no improvement in repetition rate over the prior art is disclosed.

SUMMARY

The present invention provides a method and apparatus for the generation of optical pulses at repetition rates that are greater than those of the prior art. The repetition rates of optical pulses developed through use of the present invention may be as great as hundreds of TeraHertz (THz) or more.

One aspect of the present invention includes a system for generating a grouped series or continuous train of optical pulses. The system includes a laser pulse source that is operable to repetitively produce a pulse having a frequency distribution and pulse shape, and a delay structure having an input face and a plurality of steps. Each of the plurality of steps has an output face and a step-length facet, and each of the steps is located at a different position along an optical path of the pulse than each other of the remainder of the plurality of steps. The system includes a plurality of subpulses that are replicas of the pulse and that have the same frequency distribution and pulse shape as the pulse. Each of the plurality of subpulses has a subpulse optical path and each of the plurality of subpulses corresponds to one of the plurality of steps. Each of the subpulses has a different time delay with respect to the pulse than does the remainder of the plurality of subpulses, and each of the different time delays is greater than a pulse duration of the pulse. Consequently, the plurality of subpulses has a repetition rate, which may be in the TeraHertz range or greater. The delay structure may be made of materials including non-dispersive glass and piezoelectric materials and may be tunable.

A second aspect includes a method of generating a grouped series or continuous train of optical subpulses having a TeraHertz repetition rate. The method includes the step of generating at least one pulse having a pulse duration, a pulse shape, and a frequency distribution with a laser source. At least one pulse is subdivided into a plurality of subpulses that have the same frequency distribution and pulse shape as the at least one pulse. Each subpulse within the plurality of subpulses is delayed by a duration greater than the pulse duration. A successively greater time delay is produced for each subpulse within the plurality of subpulses with respect to the at least one pulse. The optical subpulses are generated as a grouped series or a continuous pulse train with a TeraHertz repetition rate.

One or more time slots may be created within a time division multiplexing system application in response to the generation of the plurality of subpulses. One or more optical carrier signals or one or more samples of optical carrier signals may be transmitted within a timeslot over a transmission link of the time division multiplexing system. Information may be carried by the plurality of subpulses by applying standard modulation techniques. A modulation format for the modulating may be analog, pulse, or digital. When a pulse modulation format is used, pulse code modulation including on-off keying, phase-shift keying, or frequency-shift keying may be used.

DESCRIPTION OF THE DRAWINGS

The present invention will be more fully understood by reference to the following Detailed Description, accompanied by the Drawings.

FIG. 3A shows a block diagram of a system in which an optical pulse is reflected from a delay structure.

FIG. 3B shows a block diagram including focusing optics.

DETAILED DESCRIPTION

Figure 1A:
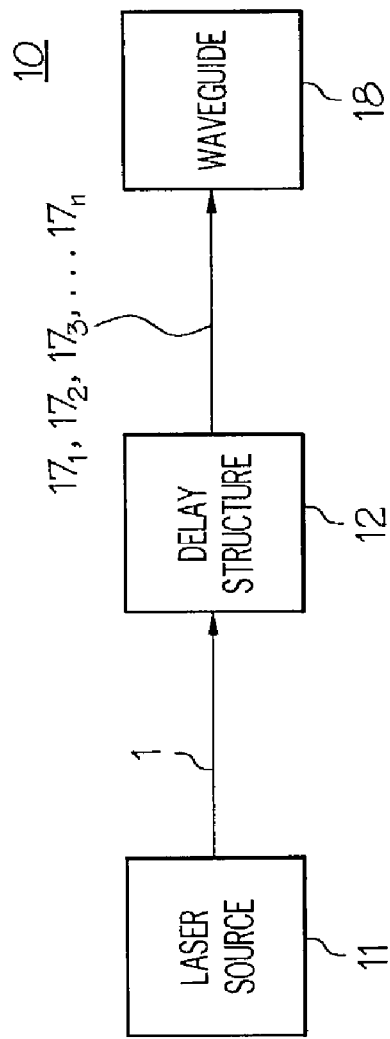
FIG. 1A shows a block diagram of a system in which an optical pulse is transmitted through a delay structure.

Referring to the drawings, aspects of the present invention are shown. The following description is provided by way of illustration only and, unless expressly stated otherwise, is not intended to limit the scope of the present invention.

Figure 1B:
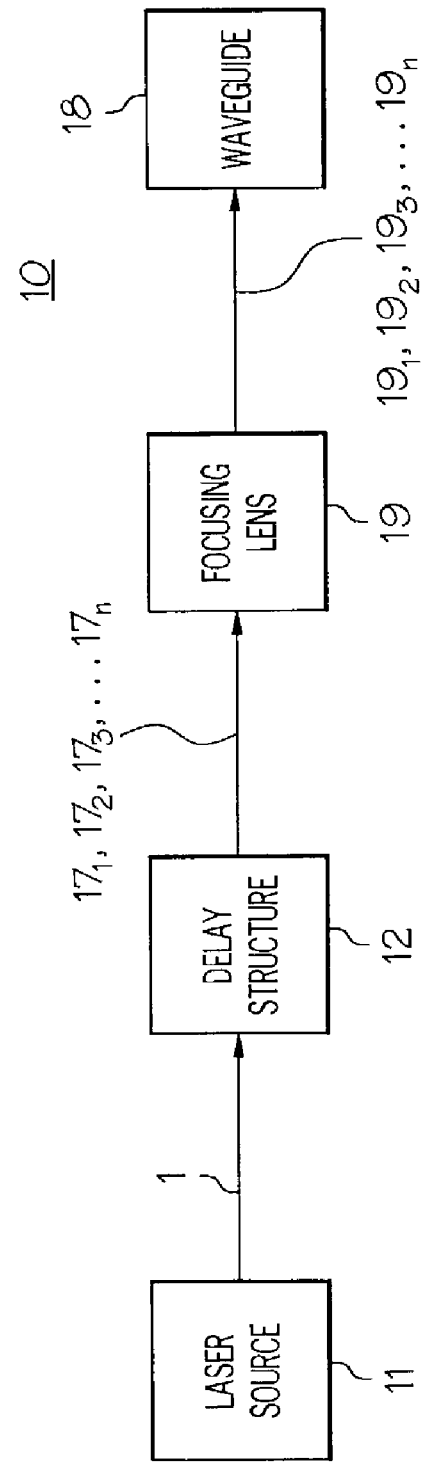
FIG. 1B shows a block diagram including focusing optics.

Referring to FIGS. 1A and 1B, a system 10 for optical pulse train generation is shown. A laser source 11 generates a pulse 1. The laser source 11 may be any type of laser that produces a pulse of optical radiation. The pulse 1 from the laser source 11 is directed to a delay structure 12. The delay structure 12 is a physical structure, which depending on the particular embodiment used, is either transparent to the pulse 1 or reflects the pulse 1. In any of the embodiments, the delay structure 12 functions to subdivide and replicate the pulse 1 into subpulses $17_1, 17_2, 17_3, \ldots 17_n$ having the same frequency distribution and pulse shape as the pulse 1, and to delay in time each of the subpulses $17_1, 17_2, 17_3, \ldots 17_n$ with respect to the pulse 1. The pulse 1 propagates through the delay structure 12, where the pulse 1 is subdivided into n subpulses $17_1, 17_2, 17_3, \ldots 17_n$ due to the geometry of the delay structure 12. In this way, the delay structure 12 effectively replicates the pulse 1 by making a continuous train or grouped series of subpulses $17_1, 17_2, 17_3, \ldots 17_n$ that have the same pulse shape and frequency distribution as the pulse 1 but with lower intensity. The geometry of the delay structure 12 also functions to delay each of the subpulses $17_1, 17_2, 17_3, \ldots 17_n$ by a different amount of time with respect to the pulse 1. The subpulses $17_1, 17_2, 17_3, \ldots 17_n$ are non-overlapping so that substantially no interference occurs between the subpulses and to ensure adequate separation. The subpulses $17_1, 17_2, 17_3, \ldots 17_n$ may then be used in any desirable way.

In preferred embodiments, the subpulses $17_1, 17_2, 17_3, \ldots 17_n$ may be collected by a waveguide 18, which may be a single mode fiber as each of the subpulses has substantially the same frequency distribution. In this way, the subpulses $17_1, 17_2, 17_3, \ldots 17_n$ may be transmitted by a structure that is smaller in cross-sectional area than the delay structure 12 itself. The subpulses $17_1, 17_2, 17_3, \ldots 17_n$ may, by way of example, also be utilized in a time division multiplexing (TDM) system, or they may used to synchronously pump laser sources, e.g., diode lasers, solid state lasers, etc. When used in conjunction with TDM systems, the subpulses $17_1, 17_2, 17_3, \ldots 17_n$ are preferably, but not necessarily, an identical time apart. In preferred embodiments the waveguide 18 is a single mode optical fiber. In certain embodiments, as for example in FIG. 1B, a focusing lens 19 may facilitate focusing of the subpulses $17_1, 17_2, 17_3, \ldots 17_n$ into the waveguide 18, when present. When the focusing lens 19 is present, it is placed in the optical path of the subpulses $17_1, 17_2, 17_3, \ldots 17_n$ as shown in FIG. 1B, and focused subpulses $19_1, 19_2, 19_3, \ldots 19_n$ are produced. The waveguide 18 may be positioned to include a focal point of the focusing lens to facilitate transmission of the focused subpulses $19_1, 19_2, 19_3, \ldots 19_n$. Other suitable optical elements including but not limited to mirrors may also be used in place of or in combination with the focusing lens 19.

In other embodiments, no waveguide is present, and the subpulses $17_1, 17_2, 17_3, \ldots 17_n$ propagate through the atmosphere or free space as opposed to via a waveguide. These embodiments are well suited for applications including but not limited to satellite communications applications and other line-of-sight communications applications. Collimating optics may be used in such applications.

By subdividing and replicating the pulse 1 into the subpulses $17_1, 17_2, 17_3, \ldots 17_n$ and successively delaying each of the subpulses $17_1, 17_2, 17_3, \ldots 17_n$ with respect to the pulse 1, the system 10 creates an increase in the repetition rate provided by the laser source 11. Current laser sources may be capable of pulse repetition rates near 1 THz. Through use of the present system 10, an increase in repetition rates of one to two orders of magnitude may be achieved for optical fiber based communications systems. For communication based on shorter wavelengths than those of typical optical fiber based communication systems, use of the present system 10 may offer an increase in repetition rates of more than two orders of magnitude. This increase in the repetition rates of optical pulses may be beneficial for optical systems in general and optical communications systems in particular. This increase in the repetition rate may also be useful in time division multiplexing ("TDM") systems by offering a higher optical timing frequency or clock frequency.

Figure 2:
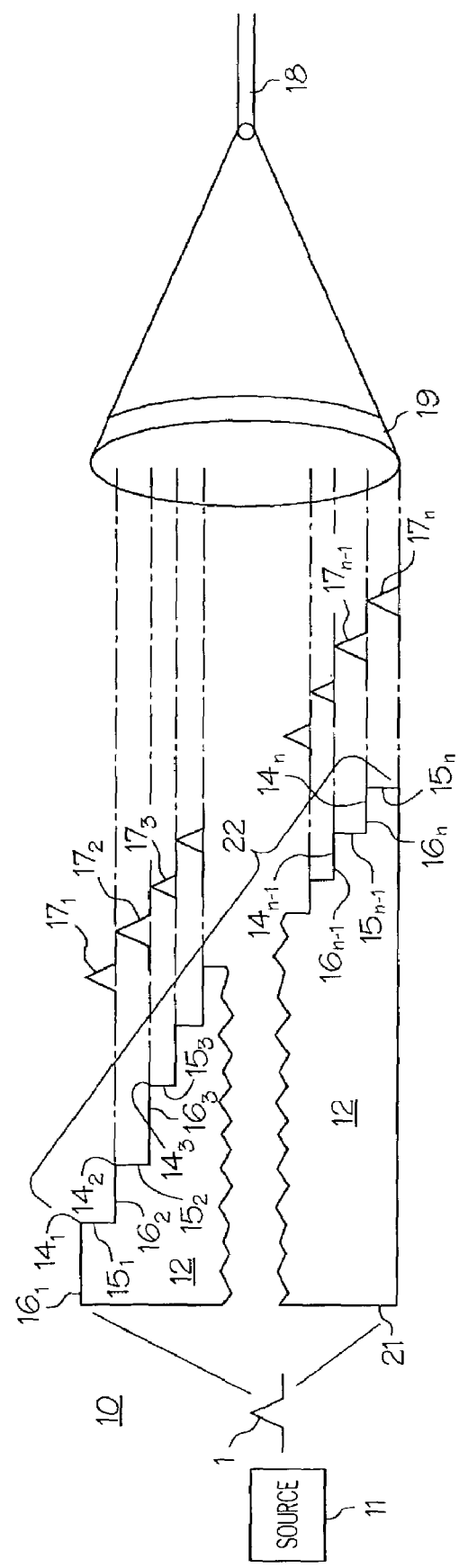
FIG. 2 shows a schematic diagram in which an optical pulse is transmitted through a delay structure.
Figure 4:
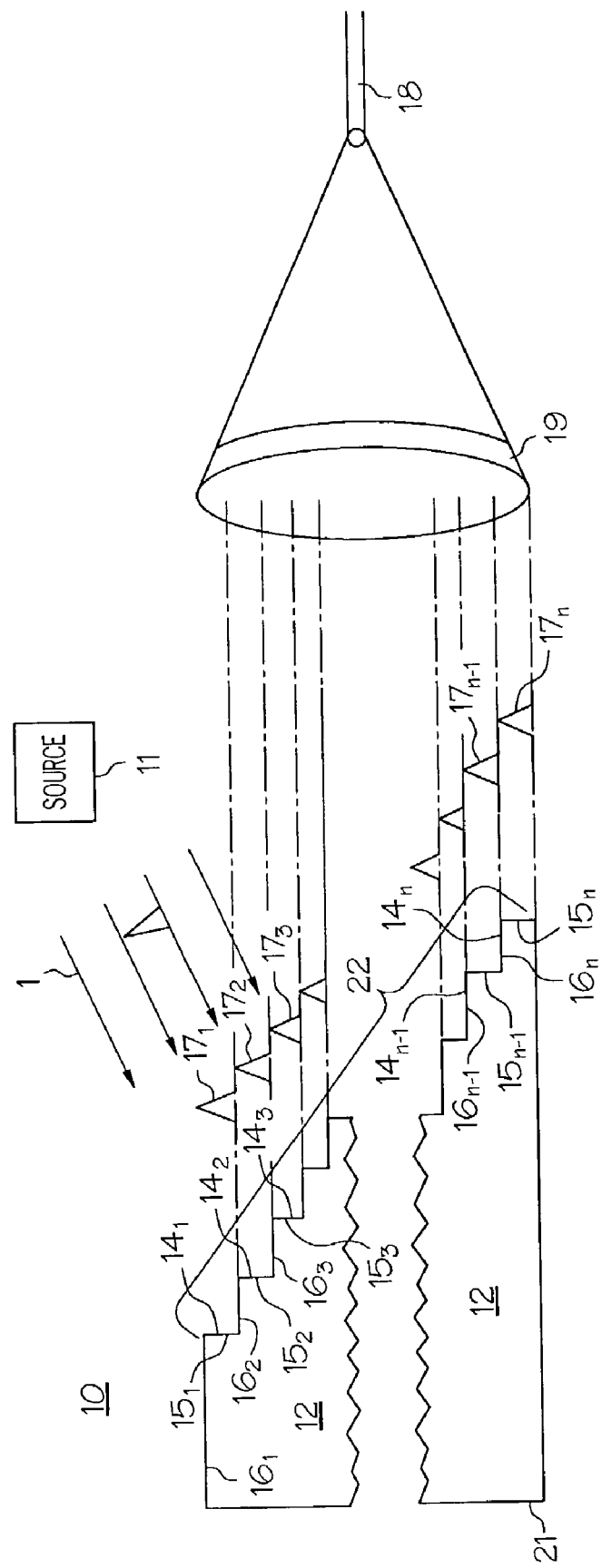
FIG. 4 shows a schematic diagram in which an optical pulse is reflected from a delay structure.

Referring now to FIG. 2, functions of the delay structure 12 and an optical path of an optical pulse 1 transmitted through the delay structure 12 may be seen in greater detail. A laser source 11 produces a pulse 1, which is then sent to a delay structure 12 that functions to replicate the pulse 1 by subdividing it into subpulses $17_1, 17_2, 17_3, \ldots 17_n$ and to impart a time delay or time shift to each of the subpulses $17_1, 17_2, 17_3, \ldots 17_n$. The delay structure 12 shown in FIG. 2 is a transmission-type delay structure. Another type if delay structure 12 is shown in FIG. 4, specifically a reflectance-type. The delay structure 12 may have any shape so long as the described functions of subdividing and replicating the pulse 1 into subpulses $17_1, 17_2, 17_3, \ldots 17_n$ and successively delaying the subpulses can be achieved. In the embodiment shown in FIG. 2, the delay structure 12 may be made of any material that is transparent to a desired frequency.

For example, in certain embodiments, the delay structure 12 may have a generally triangular shape with an input face 21 and a hypotenuse 22. A side of the delay structure, e.g. the hypotenuse 21, may have a series of steps $14_1, 14_2, 14_2, \ldots 14_n$ formed into it. The delay structure 12 is shown in FIG. 2 with a break in input face 21 to indicated that the delay structure 12 may be constructed with as many steps $14_1, 14_2, 14_2, \ldots 14_n$ as are desired. Each of these steps $14_1, 14_2, 14_2, \ldots 14_n$ may have an output face, $15_1, 15_2, 15_3, \ldots 15_n$ and a step-length facet $16_1, 16_2, 16_3, \ldots 16_n$. The pulse 1 propagates through the delay structure 12 and due to the presence of the steps $14_1, 14_2, 14_2, \ldots 14_n$ is subdivided and replicated into as many subpulses $17_1, 17_2, 17_3, \ldots 17_n$ as there are steps $14_1, 14_2, 14_2, \ldots 14_n$. The steps may be identical in shape, as for example in preferred embodiments used in TDM applications. Alternatively, the shape and dimensions of the steps may vary from step to step.

The delay structure 12 subdivides and replicates the pulse 1 into n subpulses $17_1, 17_2, 17_3, \ldots 17_n$ while also imparting a time delay to each of the respective subpulses $17_1, 17_2, 17_3, \ldots 17_n$ as they travel through the delay structure 12. Because of the imparted time delay, each subpulse, e.g., $17_1$ associated with a particular step, e.g., $14_1$, exhibits a time delay with respect to the pulse 1, and this time delay is different for each of the subpulses $17_1, 17_2, 17_3, \ldots 17_n$. This exhibited time delay is the time it takes the subpulse, e.g., $17_1$ to travel the difference in the optical path between adjacent steps, e.g., $14_1$ and $14_2$. Because each step $14_1, 14_2, $14_2, \ldots 14_n$ is at a different position along the optical path of the pulse 1 within the delay structure 12, each of the subpulses $17_1, 17_2, 17_3, \ldots 17_n$ acquires a time delay that differs from those of its neighbors, thus forming a continuous train or grouped series of optical subpulses having a repetition rate.

With continued reference to FIG. 2, an example of how the series of subpulses $17_1, 17_2, 17_3, \ldots 17_n$ may be used is shown. The series of subpulses $17_1, 17_2, 17_3, \ldots 17_n$ may be focussed into a waveguide, shown as optical fiber 18, and may then be transmitted and subsequently used by a TDM communications system (not shown). In preferred embodiments, a focusing lens 19 or other equivalent focussing optical element is present to facilitate transmission of the subpulses $17_1, 17_2, 17_3, \ldots 17_n$ into the optical fiber 18. In preferred embodiments, a focusing lens 19 is placed between an optical fiber, with the focal point of the focusing lens aligned with one end of the optical fiber. In this arrangement, the focusing lens collects the subpulses $17_1, 17_2, 17_3, \ldots 17_n$ and focuses them, producing a series of focused subpulses $19_1, 19_2, 19_3, \ldots 19_n$, which are collected by the optical fiber 18.

The grouped series or continuous train of subpulses $17_1, 17_2, 17_3, \ldots 17_n$ may be used in such a TDM system, for example to create one or more time slots for one or more carrier signals or samples of carrier signals that are transmitted over a transmission link of the TDM system. Optical fibers and bundles of optical fiber are typically used for the transmission links in such TDM systems. Information may be transmitted over the pulse train formed by the subpulses $17_1, 17_2, 17_3, \ldots 17_n$ by appropriate standard modulation techniques. A modulation format for modulating may be analog, pulse, or digital. When a pulse modulation format is used, pulse code modulation including on-off keying, phase-shift keying, or frequency-shift keying may be used.

In alternate embodiments, the delay structure 12 may have a series of waveguides of any shape, e.g., channels, strips, cylinders, etc. Any practical waveguide structure may be substituted for the step $14_1, 14_2, 14_2, \ldots 14_n$ shown in FIG. 2 so long as the delay structure 12 as a whole performs the two functions of subdividing the pulse 1 into subpulses $17_1, 17_2, 17_3, \ldots 17_n$ having the same frequency distribution and pulse shape as the pulse and also successively delaying each of the subpulses $17_1, 17_2, 17_3, \ldots 17_n$.

Referring now to FIGS. 3A and 3B, a block diagram is shown in which a pulse 1 reflects off of a delay structure 12. A laser source 11 produces a pulse 1 that is caused to reflect off of the delay structure. The delay structure 12 has a geometry that functions to subdivide the pulse 1 into subpulses $17_1, 17_2, 17_3, \ldots 17_n$. Each of the subpulses $17_1, 17_2, 17_3, \ldots 17_n$ is delayed a successively greater amount of time with respect to the pulse 1 such that a train of subpulses is generated. In this arrangement, the delay structure 12 is a reflection-type delay structure 12. A reflection type delay structure 12 is used in preferred embodiments because the pulse 1 and subpulses $17_1, 17_2, 17_3, \ldots 17_n$ are not subject to dispersion or aberration effects, which may occur in a transmission-type delay structure 12 due to the frequency-dependent nature of the index of refection of the material through which the pulse 1 and subpulses travel.

In preferred embodiments, the delay structure 12 shown in FIG. 3A reflects the pulse 1. In certain embodiments, as for example in FIG. 3B, a focusing lens 19 may facilitate focusing of the subpulses $17_1, 17_2, 17_3, \ldots 17_n$ into the waveguide 18, which may be an optical fiber. When the focusing lens 19 is present, it is placed in the optical path of the subpulses $17_1, 17_2, 17_3, \ldots 17_n$ as shown in FIG. 3B and focused subpulses $19_1, 19_2, 19_3, \ldots 19_n$ are produced. Other suitable optical elements including but not limited to mirrors may also be used in place of or in combination with the focusing lens 19. In this arrangement, the focusing lens collects the subpulses $17_1, 17_2, 17_3, \ldots 17_n$ and focuses them, producing a series of focused subpulses $19_1, 19_2, 19_3, \ldots 19_n$ which are collected by the waveguide 18.

FIG. 4 shows in greater detail a system 10 having a reflection-type delay structure 12. Similar to the embodiment shown in FIG. 1, a laser source 11 produces a pulse 1, which is input to a delay structure 12 that has "n" number of steps. The laser source 11 is arranged so that the pulse 1 is reflected from the delay structure 12. The pulse 1 is subdivided and replicated by the delay structure 12 into "n" subpulses $17_1, 17_2, 17_3, \ldots 17_n$. Each subpulse $17_1, 17_2, 17_3, \ldots 17_n$ is delayed, with respect to the pulse 1 by the amount of time it takes that subpulse, e.g., $17_1$ to travel across the associated step-length facet, e.g., $16_1$, reflect off of an associated output face, e.g., $15_1$ of that step, e.g., $14_1$, and then return. Because each step $14_1, 14_2, 14_2, \ldots 14_n$ is at a different position along the optical path of the pulse 1, each of the subpulses $17_1, 17_2, 17_3, \ldots 17_n$ is delayed by a differing amount of time with respect to the pulse 1. The subpulses $17_1, 17_2, 17_3, \ldots 17_n$ may be collected by a waveguide 18 and may be transmitted to a TDM communications system or used for other purposes. Focusing optics 19 may be present to facilitate transmission of the subpulses $17_1, 17_2, 17_3, \ldots 17_n$ into the waveguide 18. Examples of suitable focusing optics 19 include but are not limited to mirrors and lenses.

To construct the system 10, a laser source 11 that produces pulses of suitable duration is selected and then is placed in optical communication with a delay structure 12. The time it takes the individual pulses to travel the length of the individual steps must be greater than the pulse duration in order for interference between pulses to be avoided. Consequently, the length of the steps to be constructed is dependent on the duration of the pulse to be generated from the source. For higher repetition rates, shorter duration pulses are desired. This is because the length of a step must be greater than the pulse length and this length determines the time delay between adjacent subpulses. Shorter duration pulses may be obtained by using mode-locking and may also be obtained by the use of pulse-compression devices, which may include, but are not limited to, grating-pair compressors, prism-pair compressors, and chirped dielectric mirrors. The delay structure 12 is then placed in optical communication with a waveguide 18, which in preferred embodiments is an optical fiber. Focusing optics, when present, may also facilitate the collection of the subpulses $17_1, 17_2, 17_3, \ldots 17_n$ by the waveguide 18.

The delay structure 12 may be constructed by known techniques including those used for semiconductor fabrication, micro-electro-mechanical systems ("MEMS") fabrication, and diffractive optical element ("DOE") fabrication. For a general background on DOEs and associated techniques of fabrication, see Stefan Sinzinger and Jurgen Jahns, *Microoptics*, ch. 5 (1999), the contents of which are incorporated herein by reference. Examples of suitable fabrication techniques for the delay structure 12 include, but are not limited to, metallorganic chemical vapor deposition ("MOCVD"), Selective Area MOCVD, and molecular beam epitaxy, sputtering, micro-machining, thick-coating, photo-etching, and precise machining techniques. The delay structure 12 may be a unitary structure having a homogenous composition throughout. The delay structure 12 may also be made of differing materials, and may or may not contain coatings.

In preferred embodiments, the delay structure 12 may be made of a piezoelectric material or may have a piezoelectric material disposed against or on a portion of a step, e.g., $14_1$. When a piezoelectric material is present, the lengths of the steps $14_1$, $14_2$, $14_2$, ... $14_n$ may be tuned by the application of a tuning voltage to the delay structure. Consequently, the length of each step or the step-length facet, e.g., $16_1$, may be tuned by the application of a tuning voltage. In this way, the delay structure 12 may be used with different laser sources that produce pulses of different durations or the same single laser pulse source that produces pulses of varying duration. Additionally, in this way the delay structure 12 may be tuned to produce differing repetition rates for continuous trains or grouped series of subpulses. Preferred materials for the piezoelectric material include piezoelectric ceramics including barium titanate and strontium titanate, and zinc oxide.

The delay structure 12 may be designed so that a pulse train with a desired repetition rate, e.g., 1, 10, 100, 200+ THz, is produced by the system 10. A particular repetition rate may be achieved by selecting a corresponding length for the step-length facets $16_1$, $16_2$, $16_3$, ... $16_n$, taking into consideration (1) the duration of the pulse 1 provided by an available laser source 11, and (2) the fact that the delay produced by each step $14_1$, $14_2$, $14_2$, ... $14_n$ must be greater than the duration of the pulse 1 in order to prevent overlap between adjacent subpulses $17_1$, $17_2$, $17_3$, ... $17_n$ and ensure adequate separation. The relative delay between the pulse 1 and a subpulse, e.g., $17_1$, is determined by the length of the step or step-length facet, e.g., $16_1$, along the optical axis of the subpulse. An example of a design for the delay structure 12 is provided below.

In the design process of a transmission-type delay structure 12, the length of the individual steps or step-length facets, e.g., $16_1$, is influenced by the repetition rate desired and also on the pulse duration of the pulse 1 from an available source 11. For example, with known mode-locked laser sources and compression techniques, pulses of 15 femtoseconds (15×10E-15 seconds) duration and better are achieved. A laser source 11 producing pulses of this duration will be assumed for the purpose of illustrating a delay structure design procedure. Use of any type of laser source, with any type of pulse duration, is of course within the scope of the present invention. It will also be assumed that the delay structure 12 is made of glass for this design example. Although, as noted above, for a transmission-type delay structure 12 any material that is transparent to the pulse 1 may be used.

Continuing with the design process of the delay structure 12, the base-width pulse length or "pulse length" of a pulse 1 is defined herein as the speed of light in a particular medium in which the pulse is propagating multiplied by the time duration of the pulse. Since it is known that light in a vacuum (free space velocity) has an approximate speed of 3×10E8 meters per second, light will consequently travel 4.5 microns in a vacuum in that time. In a material with an index of refraction of 1.5, such as glass, light travels at two thirds the free space velocity and consequently will travel 3 microns in 15 fs. Consequently, the steps in a transmission-type delay structure 12 made from glass must have a step-length facet $16_1$, $16_2$, $16_3$, ... $16_n$ greater than the pulse length of 3 microns, when using a laser source delivering pulses of 15 fs to ensure adequate separation between subpulses $17_1$, $17_2$, $17_3$, ... $17_n$. Selecting a step-length facet of 4 microns length as a convenient example, it is determined that light will take 20 fs to travel this distance in a glass medium. Therefore, the peaks of subpulses travelling through a delay structure 12 made of glass with steps $14_1$, $14_2$, $14_2$, ... $14_n$ having step-length facets $16_1$, $16_2$, $16_3$, ... $16_n$ of 4 microns will be 20 fs apart, resulting in a repetition rate of 50 THz. For this example, a step length facet of 3.1 microns or any length greater than the 3-micron pulse length could also have been selected. The output faces $15_1$, $15_2$, $15_3$, ... $15_n$ of the delay structure 12 may be of any practical height.

A similar design procedure may be used for a reflection-type delay structure 12, for example as shown in FIG. 4. For such reflection-type delay structures 12 however, no accommodation need be made for the index of refraction of a material and the minimum length of the individual steps should be greater than twice the pulse length to take into account the path of reflection of the subpulses $17_1$, $17_2$, $17_3$, ... $17_n$.

As stated above, because the delay structure 12 serves to subdivide and replicate the pulse 1 from the source 11 into multiple sub-signals, i.e., subpulses $17_1$, $17_2$, $17_3$, ... $17_n$, which are progressively delayed in time and equivalently, phase, with respect to the pulse 1, the system 10 produces an output consisting of a train of pulses derived from the pulse 1. In preferred embodiments, each pulse in the train of pulses is delayed an identical time from each adjacent pulse. Because the system 10 of the present invention is capable of producing repetition rates of 1–400 THz and greater, it is ideally suited for Time Division Multiplexing (TDM) optical communications systems, and for that matter any communication system employing TDM techniques. In preferred embodiments for use with TDM systems, a reflectance-type delay structure 12 is used. The system 10 may have more than one delay structure 12 and these may be cascaded together to facilitate division of the pulse into many subpulses, e.g., >100. A Fourier frequency component of the series or train of subpulses $17_1$, $17_2$, $17_3$, ... $17_n$ may be detected and this Fourier frequency component may also be locked, e.g., to an external clock signal, by means such as heterodyning.

In certain embodiments, the laser source 11 may employ mode-locking, and this mode-locking may be of passive mode-locking, active mode-locking, or a combination of both. The advantage that mode-locking provides is that regardless of the type of stimulation provided, e.g., continuous-wave or pulsed, to the active material of the resonator of the laser source, a pulse train of a certain period is produced. For example, a pulse train with a period of 2d/c is produced by a mode-locked standing-wave resonator source, where d is the longitudinal distance of the resonator of the laser, and c is the speed of light. In certain embodiments, the pulse 1, or when referring to a sequence of pulses from a laser source 11, the pulse train, are compressed by known means for pulse compression. Suitable examples of such means for pulse compression include, but are not limited to, grating-pair compressors, prism-pair compressors, and chirped dielectric mirrors. In preferred embodiments, a combination of passive and active mode-locking is used. An example of such a combination of mode-locking is a saturable absorber within a resonator and an acousto-optic modulator being coupled to one of the mirrors of the resonator.

It will be understood that the foregoing description is by way of example and that it is not limiting on the scope of present invention. It is anticipated that the present invention will have greater utility as laser sources producing shorter duration pulses become known. It is also anticipated that the present invention will have greater utility as pulse compression techniques and devices for producing shorter duration pulses are developed. These foregoing anticipated improvements should be and are intended to be comprehended within the meaning and range or equivalence of the appended claims. Its will further be understood that numerous modifications and variations can be made without departing from the scope of the present invention.

What is claimed is:

1. A system for generating optical pulses comprising:
a laser source, said laser source operable to produce a pulse, said pulse having a frequency spectrum, a temporal pulse shape with a leading edge and a time duration, a beam shape with a waist diameter, and a pulse energy; and
a delay structure having an input side with a width and height and an output side spaced apart from said input side, wherein said input side is configured to receive said pulse and said height of said input side is substantially equal to said waist diameter, wherein said output side includes a plurality of step structures, wherein each of said plurality of step structures has an output face of a given shape, and a step-length facet having a length that is greater than the product of the speed of light across said step-length facet multiplied by said time duration, and wherein each of said plurality of step structures is located at a different location along said output side, wherein each of said plurality of step structure forms a unique optical path, wherein said delay structure is operable to divide said pulse into a plurality of non-overlapping pulses, wherein each of said plurality of non-overlapping pulses has a unique time delay with respect to said leading edge of said pulse, wherein each of said plurality of non-overlapping pulses has a frequency spectrum and a temporal pulse shape that is substantially similar to said frequency spectrum and said temporal pulse shape of said pulse, respectively and less energy than said pulse energy of said output pulse.

2. The system of claim 1, wherein each of said unique optical paths are substantially parallel to one another.

3. The system of claim 1, wherein said delay structure is made of non-dispersive glass.

4. The system of claim 1, wherein said delay structure includes a piezoelectric material that is operable to receive a tuning voltage, wherein each of said step-length facets is tunable in length upon an application of said tuning voltage.

5. The system of claim 4, wherein said piezoelectric material is selected from the group consisting of barium titanate, strontium titanate, and zinc oxide.

6. The system of claim 4, wherein said piezoelectric material is a piezoelectric ceramic.

7. The system of claim 1, further comprising a waveguide configured to receive each of said plurality of non-overlapping pulses.

8. The system of claim 1, wherein said plurality of non-overlapping pulses has a pulse repetition frequency greater than about 5 THz.

9. The system of claim 7, further comprising a focusing optical element disposed between said delay structure and said waveguide, wherein said focusing optical element is configured so that its focal point is within said waveguide and said waveguide is operable to receive said plurality of non-overlapping pulses.

10. The system of claim 1, wherein said pulse duration is less than about 5 fs.

11. A method of generating optical pulses, said method comprising the steps of:
generating a laser pulse having a frequency spectrum, a temporal pulse shape with a leading edge and a time duration, a beam shape with a waist diameter, and a pulse energy;
directing said laser pulse to a stepped surface of a delay structure having a plurality of step structures, wherein each of said plurality of step structures has an output face of a given shape and a step-length facet having a length that is greater than the product of the speed of light across said step-length facet multiplied by said time duration, and wherein each of said plurality of step structures forms a unique optical path for said pulse;
segmenting said laser pulse into a plurality of non-overlapping subpulses, wherein each of said plurality of non-overlapping subpulses has a substantially similar temporal pulse shape and frequency distribution as said laser pulse; and
delaying each of said plurality of non-overlapping subpulses is by a unique amount of time relative to said leading edge, wherein the difference between the time delays for subsequent non-overlapping subpulses is greater than said time duration of said pulse.

12. The method of claim 11, wherein said step of segmenting said laser pulse into a plurality of non-overlapping subpulses comprises a step of producing non-overlapping pulses having a TeraHertz repetition rate.

13. The method of claim 12, wherein said step of producing non-overlapping pulses having a TeraHertz repetition rate includes producing a continuous train of non-overlapping pulses.

14. The method of claim 11, further comprising a step of modulating said plurality of non-overlapping subpulses to transmit information.

15. The method of claim 14, wherein said step of modulating is selected from the group consisting of modulating frequency, modulating amplitude, modulating polarization, modulating phase, and combinations thereof.

16. The method of claim 15, wherein said step of modulating is selected from the group analog modulating, pulse modulating, and digital modulating.

17. The method of claim 16, wherein said step of modulating is pulse modulating.

18. The method of claim 17, wherein said step of modulating further comprises pulse code modulating.

19. The method of claim 18, wherein said step of modulating further comprises on-off keying.

20. The method of claim 18, wherein said step of modulating further comprises frequency-shift keying.

21. The method of claim 18, wherein said step of modulating further comprises phase-shift keying.

22. A system for generating optical pulses comprising:
a laser source, said laser source operable to produce a pulse, said pulse having a frequency spectrum, a temporal pulse shape with a leading edge and a time duration, a beam shape with a waist diameter, and a pulse energy; and
a delay structure having a delay surface, said delay surface comprising a plurality of step structures, wherein said delay surface is configured to receive said pulse and said height of said delay surface is substantially equal to said waist diameter, wherein each of said plurality of step structures has a reflecting face and a step-length facet having a length that is greater than the product of the speed of light across said step-length facet multiplied by said time duration, and wherein each of said plurality of step structures is located at a different position along said delay surface and forms a unique optical path; wherein said delay structure is operable to divide said pulse into a plurality of non-overlapping pulses, wherein each of said plurality of non-overlapping pulses has a unique time delay with respect to said leading edge of said pulse, wherein each of said plurality of non-overlapping pulses of laser energy has a frequency spectrum and a temporal pulse shape that are substantially similar to those of said pulse.

23. The system of claim 22, wherein each of said unique optical paths are substantially parallel to one another.

24. The system of claim 22, wherein said delay structure includes a piezoelectric material that is operable to receive a tuning voltage, wherein each of said step-length facets is tunable in length upon an application of said tuning voltage.

25. The system of claim 24, wherein said piezoelectric material is selected from the group consisting of barium titanate, strontium titanate, and zinc oxide.

26. The system of claim 24, wherein said piezoelectric material is a piezoelectric ceramic.

27. The system of claim 22, further comprising a waveguide configured to receive subpulses from each said reflecting face of said plurality of step structures, wherein said plurality of non-overlapping pulses are transmitted to said waveguide.

28. The system of claim 27, further comprising a focusing optical element disposed between said delay structure and said waveguide, wherein said focusing optical element receives said plurality of non-overlapping pulses and produces a plurality of focused non-overlapping pulses that are substantially focused at said focal point.

29. The system of claim 28, wherein said focal point is contained within said waveguide.

30. The system of claim 22, wherein said plurality of non-overlapping pulses has a pulse repetition frequency greater than about 5 THz.

31. The system of claim 22, wherein said pulse duration is less than about 5 fs.

* * * * *